US012089777B2

United States Patent
Daly et al.

(10) Patent No.: US 12,089,777 B2
(45) Date of Patent: Sep. 17, 2024

(54) STEREOVISION MONITORING SYSTEM FOR COOKING APPLIANCE

(71) Applicant: WHIRLPOOL CORPORATION, Benton Harbor, MI (US)

(72) Inventors: Michael Benjamin Daly, Watervliet, MI (US); Blake William Ehrenbeck, Evanston, IL (US); Milica Gvozdjan, Buchanan, MI (US); Seth Douglas Herndon, Osceola, IN (US); Bruce Wiatrak, Bolingbrook, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 655 days.

(21) Appl. No.: 17/350,430

(22) Filed: Jun. 17, 2021

(65) Prior Publication Data

US 2022/0400893 A1 Dec. 22, 2022

(51) Int. Cl.
*A47J 36/32* (2006.01)
*A47J 37/06* (2006.01)
*G03B 35/08* (2021.01)
*G06V 10/88* (2022.01)
*G06V 20/52* (2022.01)
*H04N 13/236* (2018.01)

(52) U.S. Cl.
CPC ........... *A47J 36/32* (2013.01); *A47J 37/0629* (2013.01); *A47J 37/0664* (2013.01); *G03B 35/08* (2013.01); *G06V 10/88* (2022.01); *G06V 20/52* (2022.01); *H04N 13/236* (2018.05)

(58) Field of Classification Search
CPC .... A47J 36/32; A47J 36/0629; A47J 36/0664; F24C 7/085; G03B 35/08; G06V 10/88; G06V 20/52; H04N 13/207; H04N 13/236
See application file for complete search history.

(56) References Cited

U.S. PATENT DOCUMENTS

| 10,228,145 B2 | 3/2019 | Erbe et al. |
| 10,739,013 B2 | 8/2020 | Bhogal |
| 10,760,794 B2 | 9/2020 | Cheng |

(Continued)

FOREIGN PATENT DOCUMENTS

| DE | 102013110642 A1 | 3/2015 |
| EP | 0512244 A1 | 11/1992 |

(Continued)

*Primary Examiner* — Dana Ross
*Assistant Examiner* — Joe E Mills, Jr.
(74) *Attorney, Agent, or Firm* — Price Heneveld LLP

(57) ABSTRACT

A cooking appliance includes a body defining a cooking cavity. A door is rotatably coupled to the body. An imager assembly is coupled to an interior surface of the door. The imager assembly includes an image sensor configured to obtain image data within a field of view, a first primary mirror positioned at a first angle proximate to the image sensor and within the field of view, and a second primary mirror positioned at a second angle proximate to the image sensor and within the field of view. A secondary mirror assembly includes multiple secondary mirrors coupled to the body within the cooking cavity. The secondary mirrors reflect image views within the cooking cavity to the first primary mirror and the second primary mirror which reflects the image views to the image sensor to be captured as the image data.

20 Claims, 12 Drawing Sheets

(56) References Cited

U.S. PATENT DOCUMENTS

| | | |
|---|---|---|
| 10,801,734 B2 | 10/2020 | Bhogal et al. |
| 10,819,905 B1 | 10/2020 | Liu et al. |
| 11,391,466 B2 * | 7/2022 | Wild .................. H04N 23/51 |
| 2018/0324908 A1 | 11/2018 | Denker et al. |
| 2019/0053332 A1 | 2/2019 | Cheng et al. |
| 2019/0110638 A1 | 4/2019 | Li et al. |
| 2019/0234617 A1 | 8/2019 | Bhogal et al. |
| 2019/0242584 A1 | 8/2019 | Ebert et al. |
| 2020/0041134 A1 | 2/2020 | Luckhardt et al. |
| 2020/0088412 A1 | 3/2020 | Bhogal et al. |
| 2020/0103120 A1 | 4/2020 | Bhogal et al. |
| 2020/0182480 A1 | 6/2020 | Bhogal et al. |
| 2020/0182481 A1 | 6/2020 | Bhogal et al. |
| 2020/0253415 A1 | 8/2020 | Stork genannt Wersborg |
| 2020/0278117 A1 | 9/2020 | Bhogal |
| 2020/0292177 A1 | 9/2020 | Bhogal et al. |
| 2021/0307135 A1 * | 9/2021 | Hooker .................. H05B 6/686 |

FOREIGN PATENT DOCUMENTS

| | | |
|---|---|---|
| EP | 3667173 A1 | 6/2020 |
| EP | 3767580 A1 | 1/2021 |
| JP | S5956620 A | 4/1984 |
| WO | 2020014159 A1 | 1/2020 |
| WO | 2020074475 A1 | 4/2020 |

* cited by examiner

STEREOVISION MONITORING SYSTEM FOR COOKING APPLIANCE

BACKGROUND OF THE DISCLOSURE

The present disclosure generally relates to a monitoring system, and more specifically, to a stereovision monitoring system for a cooking appliance.

SUMMARY OF THE DISCLOSURE

According to one aspect of the present disclosure, a cooking appliance includes a body defining a cooking cavity. A door is rotatably coupled to the body. An imager assembly is coupled to an interior surface of the door. The imager assembly includes an image sensor configured to obtain image data within a field of view, a first primary mirror positioned at a first angle proximate to the image sensor and within the field of view, and a second primary mirror positioned at a second angle proximate to the image sensor and within the field of view. A secondary mirror assembly includes multiple secondary mirrors coupled to the body within the cooking cavity. The secondary mirrors reflect image views within the cooking cavity to the first primary mirror and the second primary mirror, which reflects the image views to the image sensor to be captured as the image data.

According to another aspect of the present disclosure, a stereovision monitoring system for a cooking appliance includes a body defining a cooking cavity. A door is rotatably coupled to the body. An imager assembly is coupled to one of the door and the body. The imager assembly includes a support feature that defines an interior cavity, an imager coupled to the support feature on a first side of the interior cavity, and at least one primary mirror coupled to the support feature on a second side of the interior cavity. At least one secondary mirror is disposed within the cooking cavity. The at least one secondary mirror reflects at least one image view of the cooking cavity to the at least one primary mirror. The at least one primary mirror reflects the at least one image view to the imager to be captured as image data. A controller is operably coupled to the imager assembly to receive the image data.

According to yet another aspect of the present disclosure, an image system for a cooking appliance includes a support structure. An imager is coupled to the support structure. The imager is configured to obtain image data within a field of view. A primary mirror assembly is coupled to the support structure proximate to the imager. The primary mirror assembly includes a first primary mirror, which is disposed at a first angle within the field of view of the imager, and a second primary mirror, which is disposed at a second angle within the field of view of the imager. A secondary mirror assembly is configured to reflect image views of the cooking cavity to the primary mirror assembly. The image views are reflected by the primary mirror assembly to the imager to be captured as the image data. A controller is configured to receive the image data from the imager.

These and other features, advantages, and objects of the present disclosure will be further understood and appreciated by those skilled in the art by reference to the following specification, claims, and appended drawings.

Figure 1:
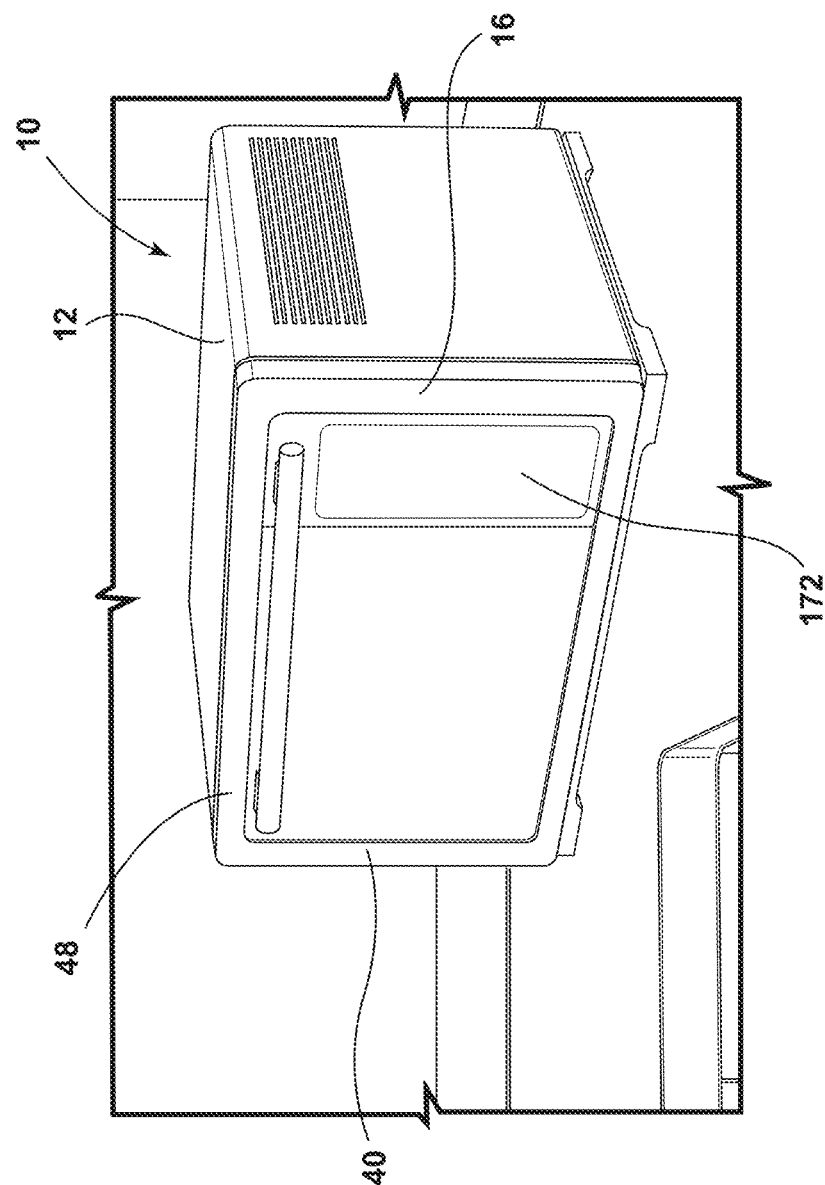
FIG. 1 is a front perspective view of a cooking appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a stereovision monitoring system for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-13, reference numeral 10 generally designates a cooking appliance that has a body 12 that defines a cooking cavity 14. A door 16 is rotatably coupled to the body 12. An imager assembly 18 is coupled to an interior surface 20 of the door 16. The imager assembly 18 includes an imager or image sensor 22 configured to obtain image data within a field of view 24. The imager assembly 18 also includes a first primary mirror 26 positioned at a first angle proximate to the image sensor 22 and within the field of view 24, and a second primary mirror 28 positioned at a second angle proximate to the image sensor 22 and within the field of view 24. A secondary mirror assembly 30 includes multiple secondary mirrors 32, 34 coupled to the body 12 within the cooking cavity 14. The secondary mirrors 32, 34 reflect image views within the cooking cavity 14 to the first primary mirror 26 and the second primary mirror 28 which reflect the image views to the image sensor 22 to be captured as the image data.

Figure 2:
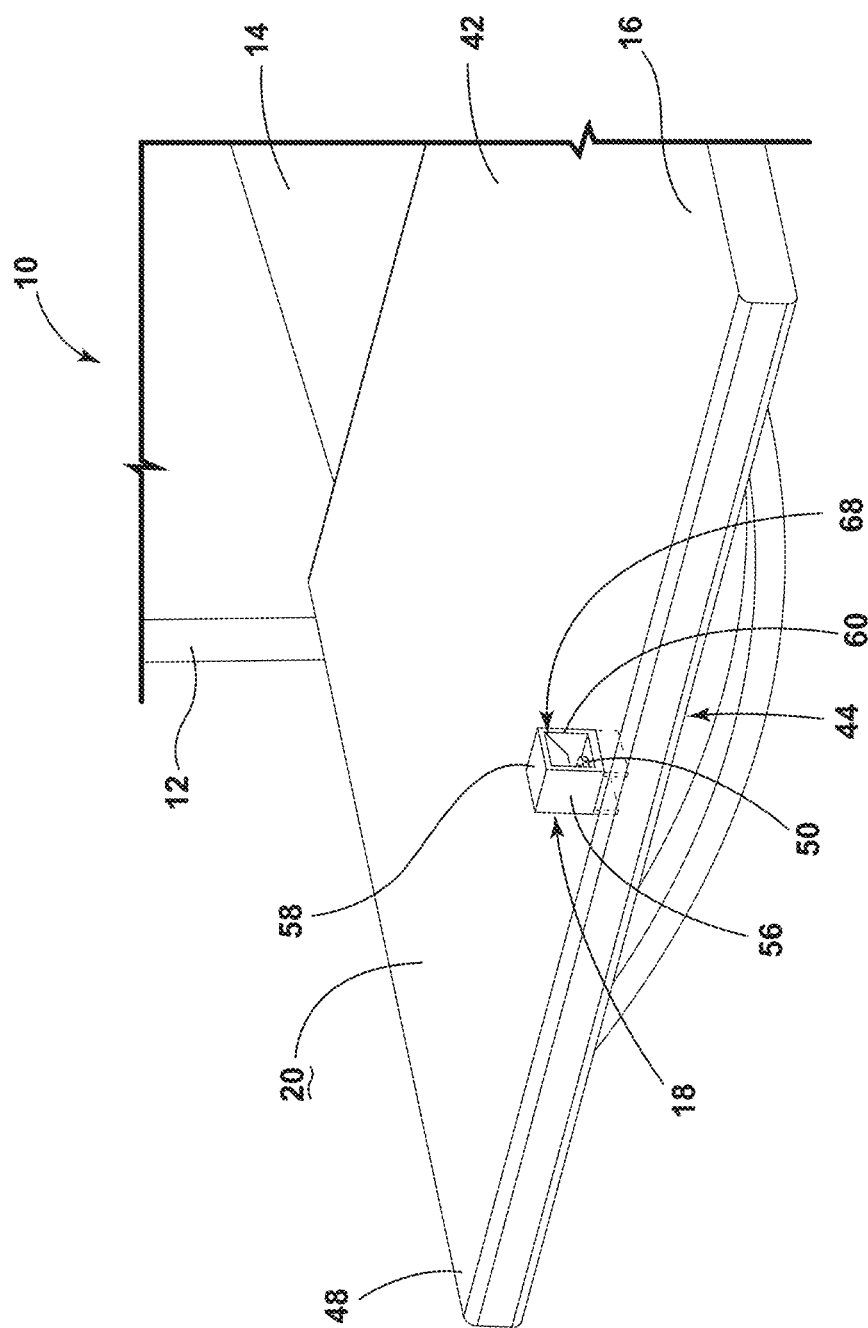
FIG. 2 is a front perspective view of an imager assembly of a monitoring system coupled to an appliance door, according to the present disclosure.

Referring to FIGS. 1 and 2, the cooking appliance 10 includes the body 12 with the door 16 rotatably coupled to the body 12. The door 16 is configured to rotate between a closed position 40 and an opened position 42 to selectively allow access to the cooking cavity 14. The cooking appliance 10 is illustrated as a single-cavity, countertop appliance. It is contemplated that the cooking appliance 10 may be a mounted appliance, a slide-in appliance, a freestanding appliance, or a countertop appliance. Additionally, the cooking appliance 10 may include the single cooking cavity 14 or multiple cooking cavities 14. Additionally or alternatively, the cooking appliance 10 may be, for example, a microwave oven, a traditional oven, or a multi-function appliance that performs oven-like functions (e.g., roast, bake, etc.) as well as other functions.

Figure 3:
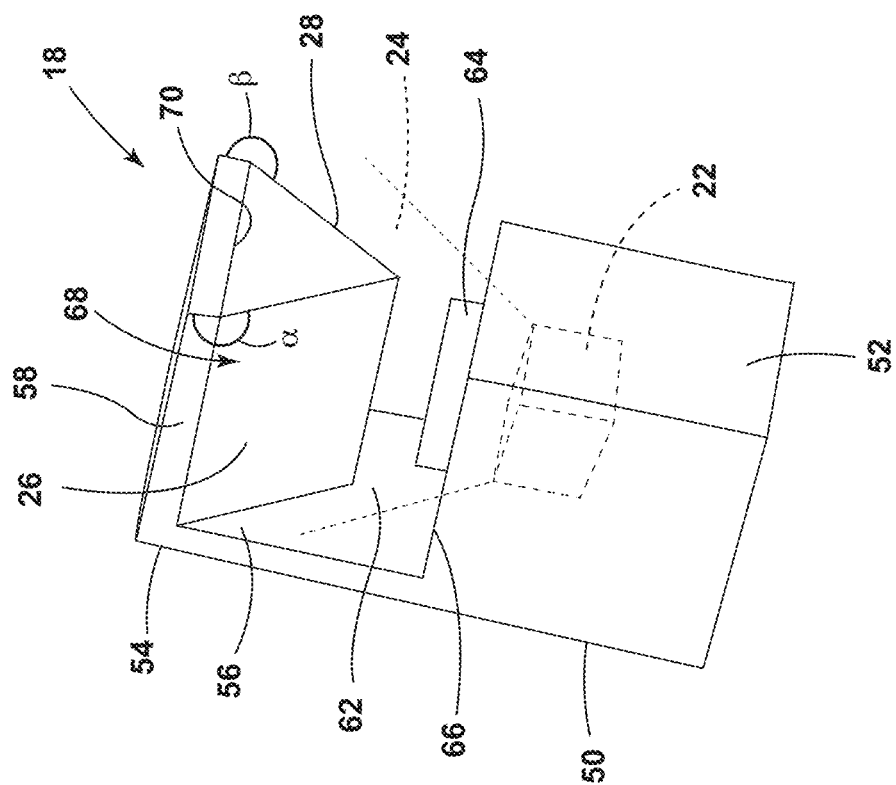
FIG. 3 is a side perspective view of an imager assembly for a cooking appliance monitoring system, according to the present disclosure.

Referring to FIG. 2, as well as FIG. 3, the cooking appliance 10 includes a monitoring system 44 for monitoring the cooking cavity 14. The monitoring system 44 is generally an image-based monitoring system 44. In certain aspects, the monitoring system 44 is a stereovision monitoring system 44 that utilizes the single image sensor 22. The monitoring system 44 includes the image sensor 22 to obtain the image data within the field of view 24. The field of view 24 of the image sensor 22 generally extends toward and at least partially into the cooking cavity 14.

The image sensor 22 may be any area type imager, such as a charge coupled device (CCD) or a complementary metal oxide semiconductor (CMOS) imager, or any type of color or black-and-white camera. In certain aspects, the image sensor 22 is a wide-angle camera configured to obtain the image data within the field of view 24 in the cooking cavity 14. As discussed further herein, the image data includes multiple image views from multiple visual angles from within the cooking cavity 14. It is contemplated that the image data may include at least one of a picture, a video, real-time streaming of image data, other transmissions of image data, or combinations thereof without departing from the teachings herein. The stereovision monitoring system 44 provides the multiple image views using the single image sensor 22.

In the example illustrated in FIG. 2, the imager assembly 18 is coupled to the interior surface 20 of the door 16. The imager assembly 18 is centrally located proximate to an upper edge 48 of the door 16 but may be coupled to any practicable position on the door 16. The imager assembly 18 includes a support structure 50 that couples to the door 16. The support structure 50 includes a base housing 52 and a support feature 54. The base housing 52 is generally disposed within the interior of the door 16, while the support feature 54 extends through and away from the interior surface 20 of the door 16. In certain aspects, the door 16 may include multiple glass panels. The image sensor 22 may be disposed between two adjacent layers of glass panels on the door 16.

The support feature 54 may have three walls 56, 58, 60, as illustrated in FIG. 2, or may have two walls 56, 58, as illustrated in FIG. 3. In the example illustrated in FIG. 2, two walls 56, 60 extend from the base housing 52 and are generally parallel. The wall 58 extends between the two walls 56, 60 and extends generally parallel to a surface of the base housing 52. The wall 58 is positioned directly between the image sensor 22 and the cooking cavity 14. When the door 16 is in the closed position 40 (FIG. 1), the wall 56 is an upper wall, the wall 58 is an inner wall, and, if included, the wall 60 is a lower wall.

The walls 56, 58, 60 and the base housing 52 define an interior cavity 62 therebetween. In various examples, the support feature 54 includes the walls 56, 58, and may not include the third wall 60, as illustrated in FIG. 3. In such configurations, the support feature 54 has an L-shape extending away from and then parallel to the base housing 52. A lens 64 is coupled to the base housing 52 on a first side 66 of the interior cavity 62 and aligns with the image sensor 22 disposed within the base housing 52. A primary mirror assembly 68, including the first and second primary mirrors 26, 28, is coupled to the wall 58 on a second side 70 of the interior cavity 62. The primary mirror assembly 68 is disposed proximate to the lens 64 and within the field of view 24 of the image sensor 22. The interior cavity 62 is a sufficient size to house the lens 64 and the primary mirror assembly 68 spaced from one another.

As previously stated, the primary mirror assembly 68 includes the first and second primary mirrors 26, 28. The first and second primary mirrors 26, 28 are each coupled to the wall 58 and extend into the interior cavity 62. The primary mirrors 26, 28 may not extend out of the interior cavity 62. Additionally or alternatively, the first primary mirror 26 is disposed at a first angle α and the second primary mirror 28 is disposed on a second angle β relative to the wall 58. Generally, the first and second angles α, β are mirror images of one another. The primary mirrors 26, 28 extend from the wall 58 and toward one another. In various aspects, the primary mirrors 26, 28 are coupled to or abut one another proximate to the lens 64. The specific angles α, β of the primary mirrors 26, 28 may be adjusted to reflect the image views to the image sensor 22 to be captured as the image data, as described further herein. It is contemplated that the field of view 24 is split and diverted generally parallel to the interior surface 20 of the door 16 to the secondary mirror assembly 30 by the primary mirror assembly 68. The secondary mirror assembly 30 is oriented to direct light towards the cooking cavity 14.

When the imager assembly 18 is coupled to the door 16, the primary mirror assembly 68 is oriented laterally. In such configurations, the wall 56 is an upper wall and the wall 60, if included, is a lower wall, leaving open lateral sides for the primary mirror assembly 68 to reflect the image views. Further, in such configurations, the first primary mirror 26 is oriented in a first lateral direction (e.g., right) and the second primary mirror 28 is oriented in a second lateral direction (e.g., left).

Figure 4:
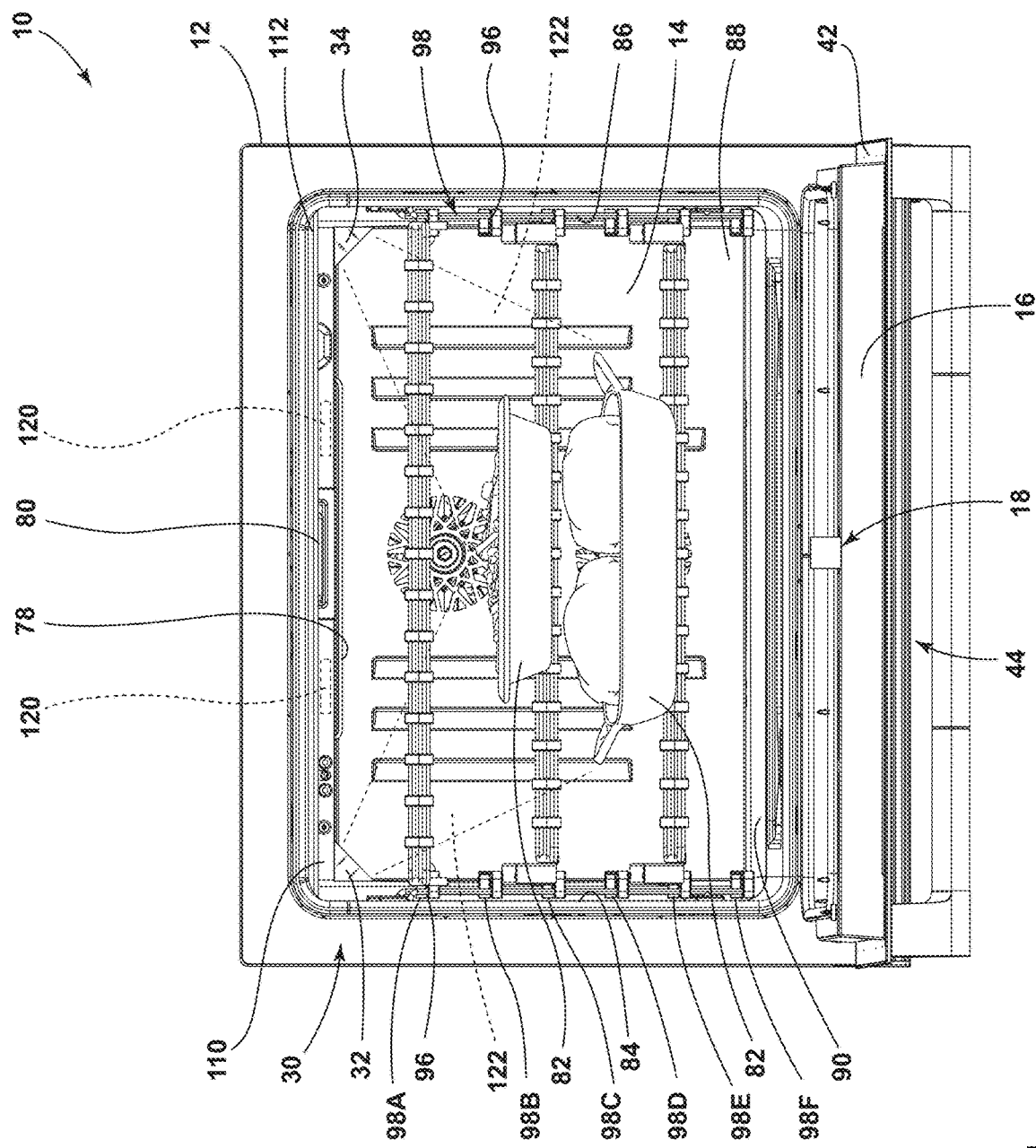
FIG. 4 is a front elevational view of a cooking cavity having two secondary mirrors arranged in an upper corner, according to the present disclosure.

Referring to FIG. 4, the cooking appliance 10 includes a heating element 78 generally coupled in a top wall 80 that defines the cooking cavity 14. It is contemplated that the heating element 78 may be disposed in additional or alternative locations without departing from the teachings herein. The heating element 78 is configured to produce or generate heat within the cooking cavity 14 to cook food items 82 placed in the cooking cavity 14. The cooking cavity 14 is generally defined by multiple walls including two sidewalls 84, 86, a rear wall 88, the top wall 80, and a bottom wall 90.

The sidewalls 84, 86 includes supports 96 arranged to define multiple cooking levels 98. In the illustrated configuration of FIG. 4, the supports 96 defined five cooking levels 98A-98F, which are generally referred to herein as the cooking levels 98. Multiple racks 100 are illustrated within the cooking cavity 14 on the supports 96. At any given time, one or more racks 100 may be disposed within the cooking cavity 14 at the various cooking levels 98. The food items 82 are supported on the racks 100. The user may adjust the number and position (e.g., the cooking level 98) of each rack 100.

The cooking appliance 10 includes one or more light sources 120 operably coupled with the cooking cavity 14. Generally, the light sources 120 emit light into the cooking cavity 14. The light sources 120 generally control an intensity and color of light within the cooking cavity 14. The light sources 120 may remain activated (e.g., emitting light) when the imager assembly 18 is activated to illuminate the cooking cavity 14 and thereby allowing the imager assembly 18 to obtain the image data. As the imager assembly 18 may be utilized to monitor an entire cooking process, or a substantial portion thereof, the light source 120 may also be activated during the entire or a substantial portion of the cooking process.

In various examples, the light source 120 may emit visible light that has a wavelength in a range of from about 380 nm to about 740 nm, or a mix of wavelengths in this range. The light source 120 may include any form of light source, for example, fluorescent lighting, light emitting diodes (LEDs), organic LEDs (OLEDs), polymer LEDs (PLEDs), laser diodes, quantum dot LEDs (QD-LEDs), solid-state lighting, a hybrid, and/or any other similar device. Any other form of lighting may be utilized within the cooking appliance 10 without departing from the teachings herein. Further, various types of LEDs are suitable for use as the light source 120, including, but not limited to, top-emitting LEDs, side-emitting LEDs, and others. According to various examples, multicolored light sources, such as Red, Green, and Blue (RGB) LEDs that employ red, green, and blue LED packaging may be used to generate various desired colors of light output from a single light source, according to known light color mixing techniques. Moreover, the light source 120 may be configured as a single light source, or alternatively, as more than one light source that can be selectively and independently controlled. Moreover, the light sources 120 may emit any wavelength of light for illuminating the cooking cavity 14 to obtain the image data without departing from the teachings herein.

Figure 5:
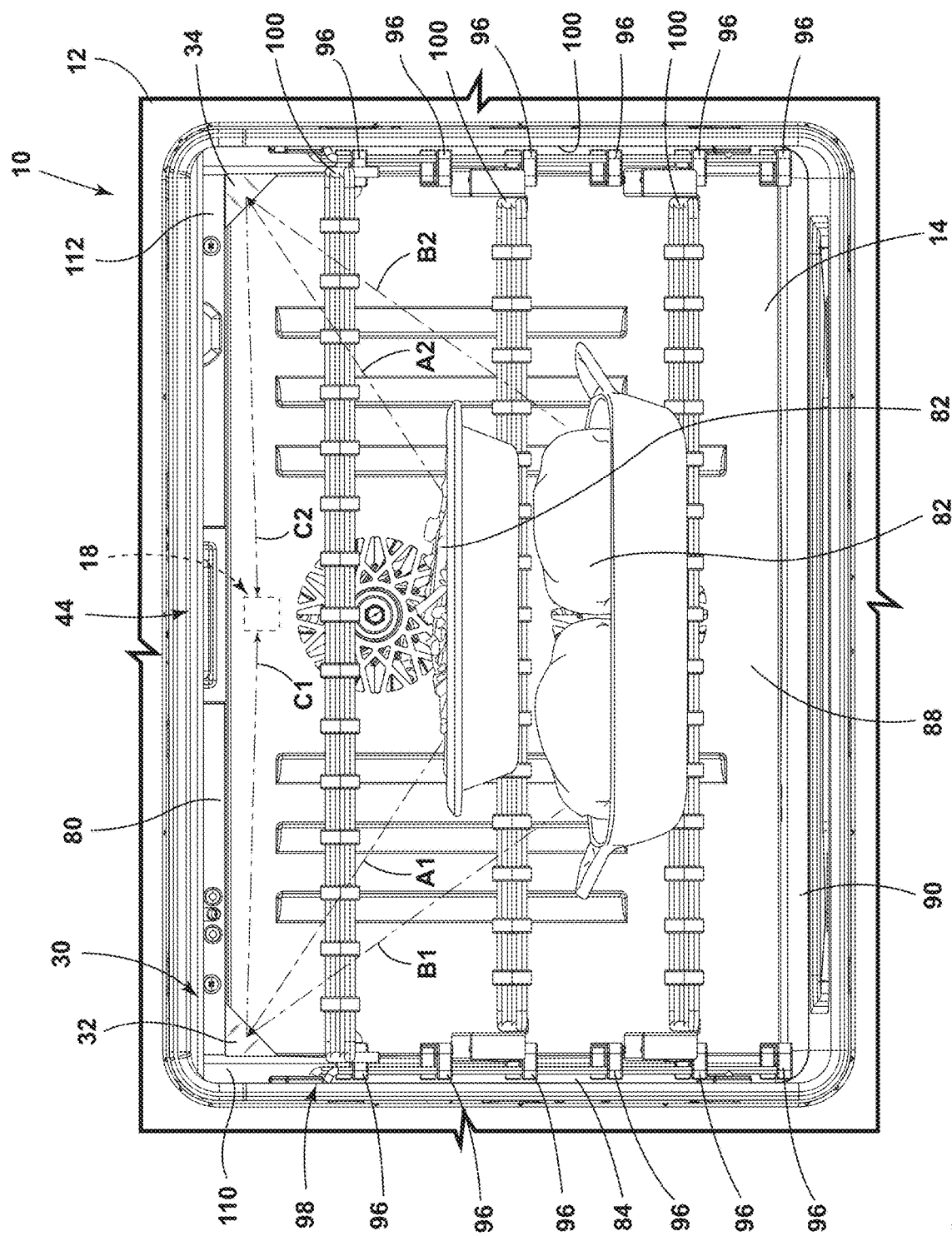
FIG. 5 is a front elevational view of the cooking cavity of FIG. 4 illustrating image views represented by arrows A1, A2 and arrows B1, B2, within reflection zones of the secondary mirrors being reflected from the secondary mirrors to an imager assembly, as represented by arrows C1, C2, according to the present disclosure.

Referring still to FIG. 4, as well as to FIG. 5, the secondary mirror assembly 30 is disposed within the cooking cavity 14. In the illustrated configuration, two secondary mirrors 32, 34 are included in the secondary mirror assembly 30. The first secondary mirror 32 is disposed in an upper rear corner 110 within the cooking cavity 14, and the second secondary mirror 34 is disposed in an opposing upper rear corner 112. The secondary mirrors 32, 34 are oriented at predefined angles for reflecting the image views of the food items 82 from different visual angles to the imager assembly 18.

Each of the secondary mirrors 32, 34 includes a reflection zone 122 within the cooking cavity 14. The reflection zone 122 includes an area within the cooking cavity 14 that is reflected by each secondary mirror 32, 34. In the example illustrated in FIG. 5, with the two secondary mirrors 32, 34, the secondary mirror assembly 30 has two reflection zones 122. The reflection zones 122 are oriented at different or opposing angles within the cooking cavity 14, with each reflection zone 122 corresponding with one of the secondary mirrors 32, 34. In this way, a first side of the food item 82 is included in the reflection zone 122 of the secondary mirror 32 and a second opposing side of the food item 82 is included in the reflection zone 122 corresponding to the secondary mirror 34. Additionally or alternatively, the food item 82 in the various reflection zones 122 reflects light toward the secondary mirror assembly 30. The secondary mirrors 32, 34 may be disposed at angles that are mirror images of one another, or alternative may be disposed at different angles depending on the location of the imager assembly 18.

The image view of the first side of the two food items 82 is represented by arrow A1 and arrow B1, respectively. The arrows A1, B1 represent the image view within the reflection zone 122 of the secondary mirror 110. The secondary mirror 32 then reflects the image views A1, B1 to the imager assembly 18, represented by arrow C1. The image view represented by the arrow C1 is captured by the imager assembly 18. Similarly, the image view of the second side of the two food items 82 is represented by arrow A2 and arrow B2, respectively. The image views represented by the arrows A2, B2 are then reflected by the secondary mirror 34 to the imager assembly 18, as represented by arrow C2. In this way, the reflected image views represented by the arrows C1, C2 may be captured simultaneously by the imager assembly 18 to capture different image views (e.g., A1, B1 and A2, B2) within the cooking cavity 14.

Figure 6:
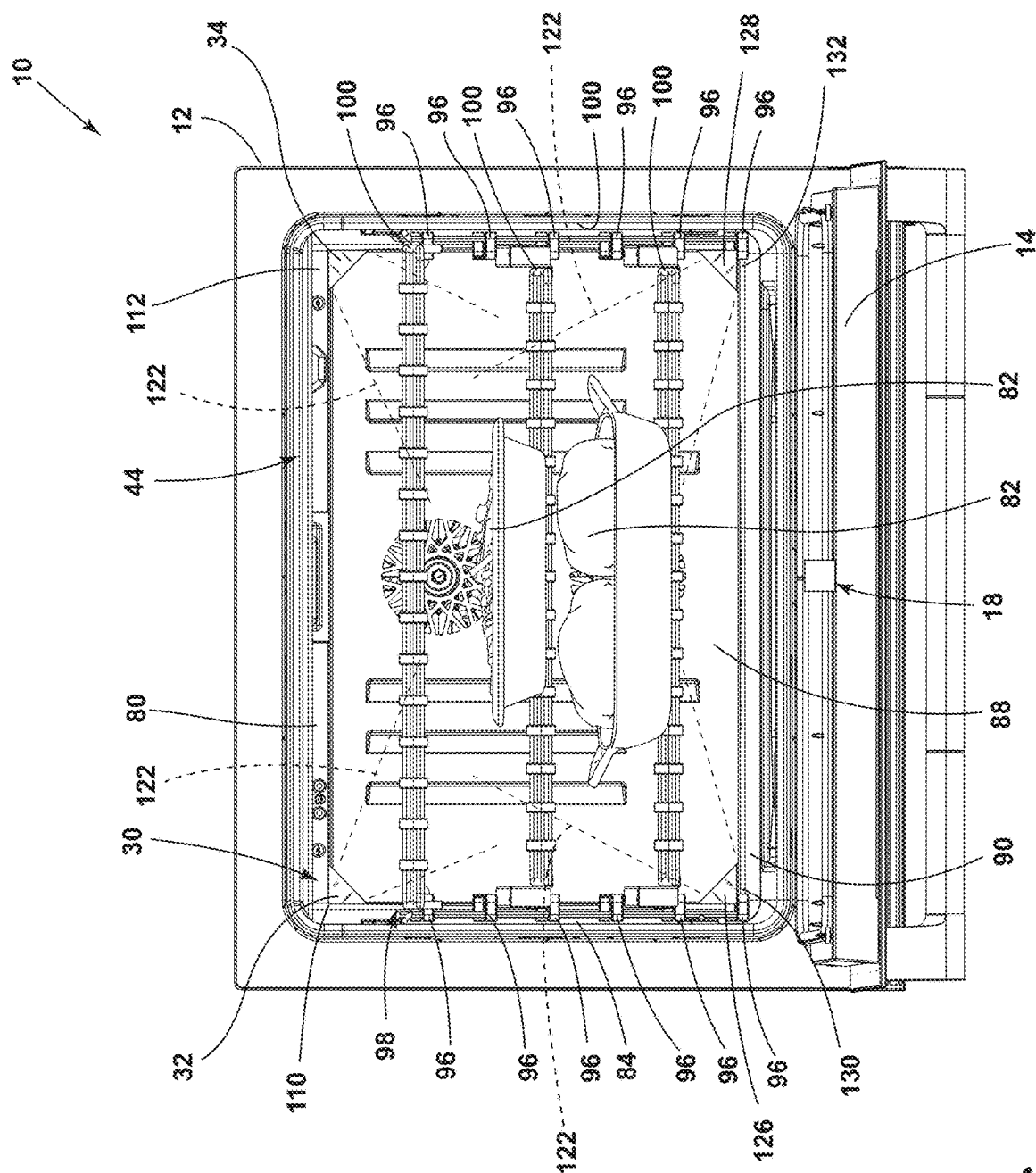
FIG. 6 is a front elevational view of a cooking cavity with four secondary mirrors arranged in upper and lower corners, according to the present disclosure.

Referring to FIG. 6, an additional alternative configuration of the secondary mirror assembly 30 is illustrated. As illustrated in FIG. 6, the secondary mirror assembly 30 includes four secondary mirrors 32, 34, 126, 128. The secondary mirrors 32, 34 are disposed in the upper rear corners 110, 112, respectively. The secondary mirror 126 is disposed in a lower rear corner 130, and the secondary mirror 128 is disposed in an opposing lower rear corner 132. In this way, each corner 110, 112, 130, 132 proximate to the rear wall 88 includes one secondary mirror 32, 34, 126, 128 disposed at a predefined angle. Similar to the secondary mirrors 32, 34, the secondary mirrors 126, 128 may be arranged as mirror images of one another or may be arranged at different angles. Further, the secondary mirrors 32, 34 may be mirror images of the secondary mirrors 126, 128 (e.g., over a y-axis).

Each of the secondary mirrors 32, 34, 126, 128 is configured to reflect a separate image view toward the imager assembly 18. In this way, four separate image views corresponding with different visual angles may be reflected to the imager assembly 18 to be captured in the image data. The image views in the illustrated configuration may include a first side upper view, a second side upper view, a first side lower view, and a second side lower view. However, the different image views may be adjusted based on the positioning and angle of the secondary mirror assembly 30.

Referring again to FIGS. 2-6, the position and angles of the secondary mirror assembly 30 may be determined by the relationship between the image sensor 22 and the secondary mirrors 32, 34, 126, 128. Various components that may affect the arrangement of the monitoring system 44 include a focal length of the image sensor 22, the field of view 24 of the image sensor 22, x- and y-dimensions of the image sensor 22, and pixels in the image data. The secondary mirrors 32, 34, 126, 128 may be any practicable size based on the image sensor 22. For example, when the imager assembly 18 is coupled to a central location on the door 16, the position of the secondary mirrors 32, 34, 126, 128 may be determined by Equation (I) and Equation (II) below:

$$\text{Roll} = a\sin\left(\frac{\frac{h_{cavity}}{s} - v_{offset}}{\frac{w_{cavity}}{2}}\right), \quad \text{Equation (I)}$$

$$\text{Yaw} = a\sin\left(\frac{\frac{d_{cavity}}{s} - h_{offset}}{\frac{w_{cavity}}{2}}\right), \quad \text{Equation (II)}$$

where $h_{cavity}$, $w_{cavity}$, and $d_{cavity}$ are a height, a width, and a depth, respectively, of the cooking cavity 14, $v_{offset}$ is a distance between the top wall 80 of the cooking cavity 14 and the image sensor 22, and $h_{offset}$ is a distance a center of the primary mirrors 26, 28 extend from door 16.

Figure 7:
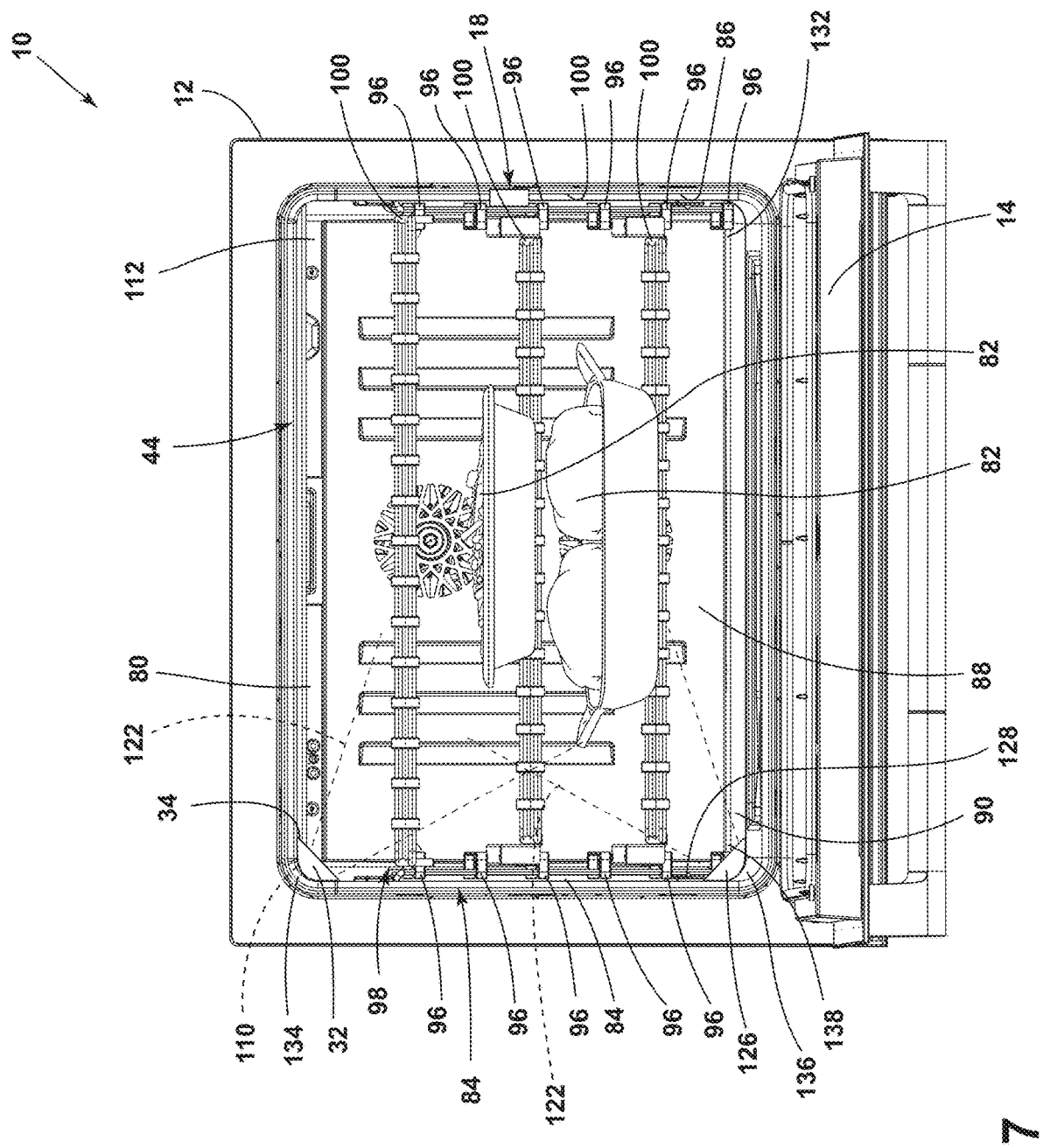
FIG. 7 is a front elevational view of a cooking cavity with four secondary mirrors arranged in upper and lower corners on a single side of the cooking cavity opposite of an imager assembly, according to the present disclosure.

Referring to FIG. 7, an additional or alternative configuration of the monitoring system 44 is illustrated. In the illustrated example, the imager assembly 18 is coupled to the sidewall 86 of the cooking appliance 10 that defines the cooking cavity 14. The imager assembly 18 may extend partially into the cooking cavity 14, as illustrated, or may be disposed behind the sidewall 86 and aligned with a transparent portion or window of the sidewall 86 to obtain the image data from the cooking cavity 14. In the configuration illustrated in FIG. 7, four secondary mirrors 32, 34, 126, 128 are included in the cooking cavity 14. The secondary mirror 32 is disposed in an upper front corner 134, the secondary mirror 34 is disposed in the upper rear corner 110, the secondary mirror 126 is disposed in a lower front corner 136, and the secondary mirror 128 the disposed in a lower front corner 138. Each of the secondary mirrors 32 reflects the image view from the corresponding reflection zone 122 to the imager assembly 18. In the illustrated configuration, the image views may include a combination of upper and lower, as well as front and rear image views.

Figure 8:
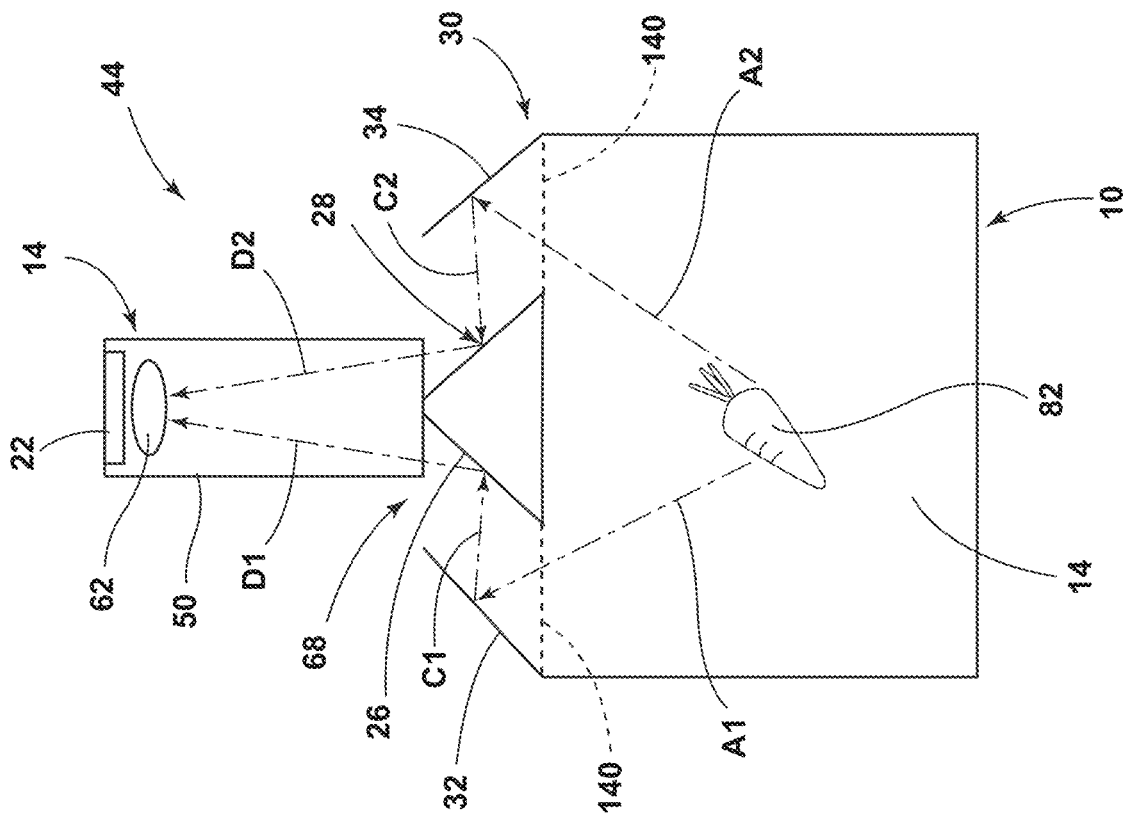
FIG. 8 is a schematic diagram of a monitoring system with secondary mirrors disposed proximate to windows for reflecting image views represented by arrows A1, A2 from the secondary mirrors to an imager assembly, as represented by arrows C1, C2 and arrows D1, D2, according to the present disclosure.

Referring to FIG. 8, a schematic diagram of an additional or alternative configuration of the monitoring system 44 is illustrated. The secondary mirrors 32, 34 may be disposed outside of the cooking cavity 14 and be aligned with windows 140 or other transparent portions that provide a view into the cooking cavity 14. The secondary mirrors 32, 34 and the imager assembly 18 with the primary mirror assembly 68 are disposed on the same side of the cooking cavity 14. For example, each of the imager assembly 18 and the secondary mirrors 32 may be coupled to the door 16 or alternatively, the secondary mirrors 32, 34 may be arranged on a front of the body and the imager assembly 18 may be coupled to the door 16. When the secondary mirrors 32, 34 are coupled to the body 12, the secondary mirrors 32, 34 may be disposed in tunnels adjacent to the cooking cavity 14 and separated from the cooking cavity 14 by the windows 140. The windows 140 may act to form a periscope view for the secondary mirrors 32, 34 and the secondary mirrors 32, 34 are protected from heat, grease, and food splatter. Two separate image views of the food item 82 within the cooking cavity 14 are reflected from the secondary mirrors 32, 34 to the primary mirrors 26, 28 and, subsequently, to the imager assembly 18.

Figure 9:
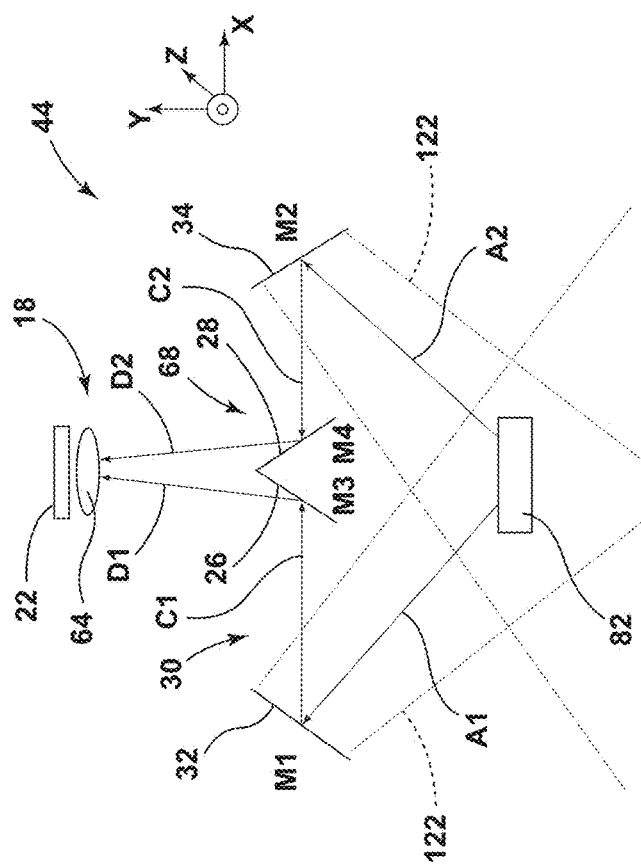
FIG. 9 is a schematic diagram of a monitoring system with an imager assembly disposed vertically above mirrors with image views represented by arrows A1, A2 being directed to the mirrors and subsequently reflected to the imager assembly, as represented by arrows C1, C2 and arrows D1, D2, according to the present disclosure.
Figure 11:
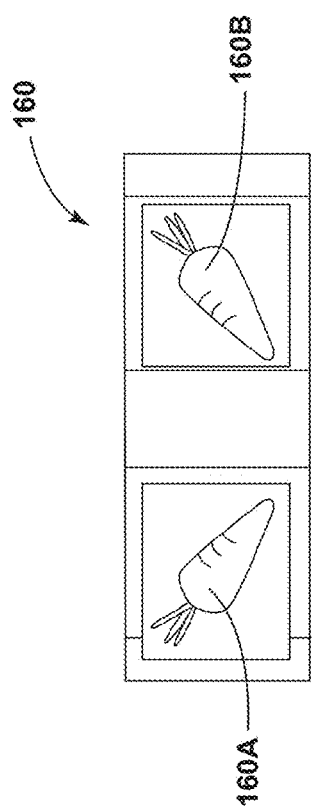
FIG. 11 is representative of two sub-images derived from image data captured in a cooking cavity by a stereovision monitoring system, according to the present disclosure.

Referring to FIG. 9, a schematic diagram of an additional alternative configuration of the monitoring system 44 is illustrated. The monitoring system 44 includes four total mirrors, including two secondary mirrors 32, 34 and two primary mirrors 26, 28. The secondary mirrors 32, 34 have the corresponding reflection zones 122 oriented toward the food item 82 disposed within the cooking cavity 14. Two opposing image views are reflected from the reflection zones 122 by the secondary mirrors 32, 34 to the primary mirrors 26, 28. The primary mirror assembly 68 may be included in or separate from the imager assembly 18 and arranged to reflect the image views to the image sensor 22 to be captured as the image data.

In the illustrated example, the image sensor 22 may be positioned vertically above the primary mirror assembly 68 and the secondary mirror assembly 30, for example on the top wall 80. The primary mirror assembly 68 and the secondary mirror assembly 30 may be arranged along an x-axis of the cooking appliance 10. In this way, the field of view 24 of the imager assembly 18 may extend downward toward the cooking cavity 14 and include the primary mirror assembly 68.

Referring again to FIG. 8 and still to FIG. 9, two separate image views, represented by the arrows A1, A2, are captured by the imager assembly 18. The image view of the first side of the food item 82, represented by the arrow A1, is included in the reflection zone 122 of the secondary mirror 32. The secondary mirror 32 reflects the image view represented by arrow A1 to the primary mirror 26 of the imager assembly 18, as represented by the arrow C1. The primary mirror 26 then reflects the image view, represented by arrow D1, to the image sensor 22.

Similarly, the image view of the second side of the food item 82, represented by the arrow A2, is included in the reflection zone 122 of the secondary mirror 34 and is reflected to the primary mirror 28, as represented by the arrow C2. The primary mirror 28 then reflects the image view to the image sensor 22, as represented by the arrow D2. The image views represented by the arrows D1, D2 may be directed through a light tunnel, optics, the lens 62, etc. to direct the image views to the image sensor 22 to be captured.

While the image views are represented by arrows it is understood that the image views generally include a broader area within the cooking cavity 14 included in the reflection zones 122. The image views of the broader area are reflected to and captured by the imager assembly 18.

Referring to FIGS. 2-9, the configuration of the monitoring system 44 is flexible. The position of the imager assembly 18, the primary mirror assembly 68, and/or the secondary mirror assembly 30 may be adjusted to any practicable position that allows the image views to be reflected to the image sensor 22. The secondary mirror assembly 30 may be arranged in the upper corners of the cooking cavity 14, the lower corners of the cooking cavity 14, the rear corners of the cooking cavity 14, and/or the front corners of the cooking cavity 14. Additionally or alternatively, the secondary mirror assembly 30 may be disposed on a y-axis within the cooking cavity 30. In additional non-limiting examples, the secondary mirror assembly 30 may be arranged on either of the sidewalls 84, 86 or the rear wall 88. Further, the secondary mirror assembly 30 may be arranged outside of the cooking cavity 14. The position of the secondary mirrors 32, 34, 126, 128 may depend on the position of the image sensor 22.

The image sensor 22 may be arranged on the door 16 or within the cooking cavity 14.

The secondary mirror assembly 30 is arranged to reflect multiple image views to the primary mirror assembly 68, which consequently reflects the image views to the image sensor 22. The image sensor 22 is positioned proximate to the primary mirrors 26, 28 that reflect the image views from two to four secondary mirrors 32, 34, 126, 128 to show two to four unique vantage points or perspectives of the cooking cavity 14. The imager assembly 18 is spaced from the heating element 78 to protect the image sensor 22 and other electronic components within the imager assembly 18 from overheating and, consequently, damage and failure. Additionally, when the imager assembly 18 is positioned on an outer portion of the cooking cavity 14, the lens 64 is more protected from food splatter.

Figure 10:
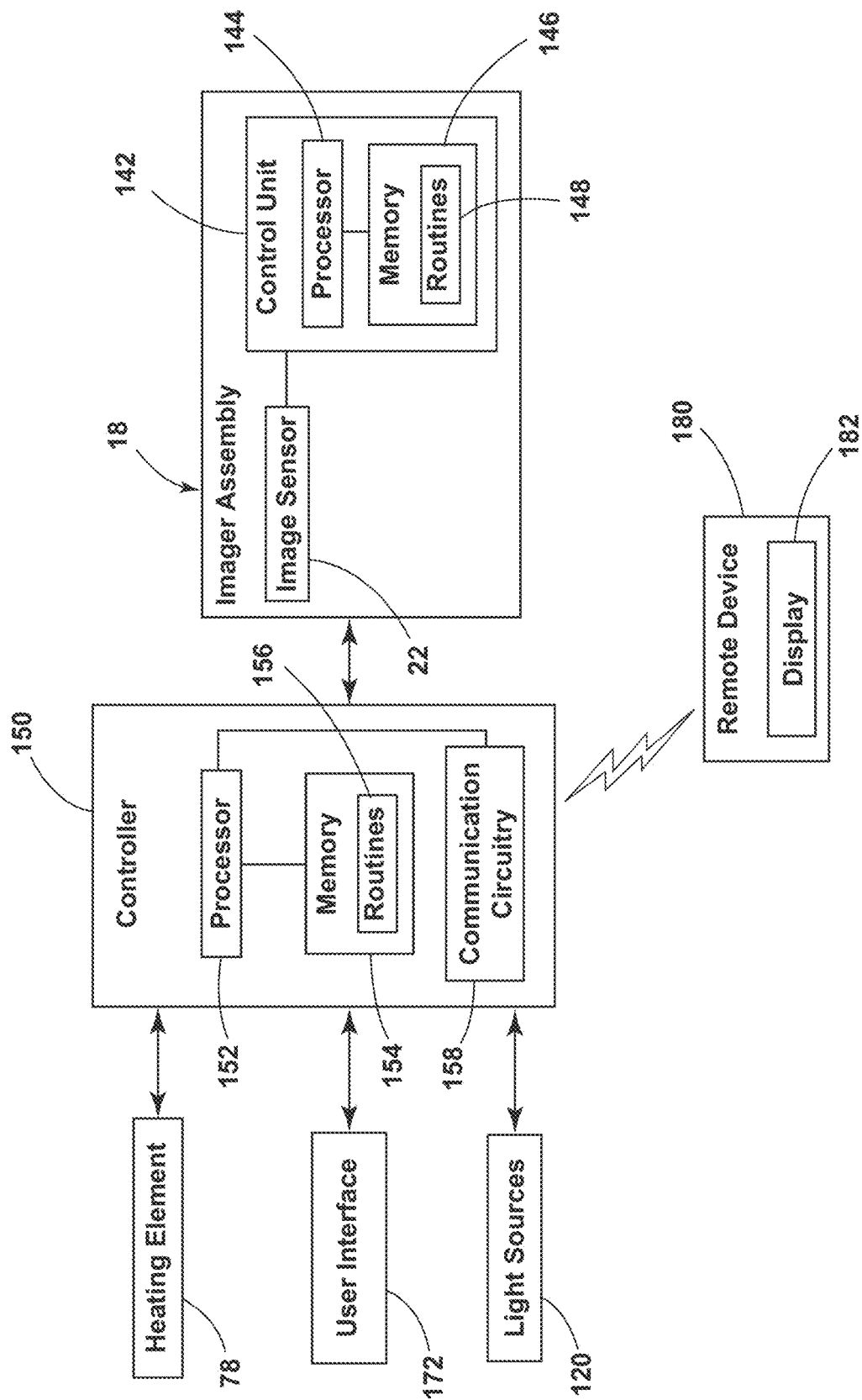
FIG. 10 is a block diagram of a monitoring system for a cooking appliance, according to the present disclosure.

Referring to FIG. 10, as well as to FIGS. 1-9, the imager assembly 18 generally includes a control unit 142 having a processor 144, a memory 146, and other control circuitry. Instructions or routines 148 are stored with the memory 146 and executable by the processor 144. The imager assembly 18 is configured to capture the image data from within the field of view 24. The field of view 24 includes the primary mirror assembly 68, which reflects the image views of the cooking cavity 14 from the secondary mirror assembly 30. The reflected image views are captured as the image data by the image sensor 22 and processed by the control unit 142. In certain aspects, the control unit 142 may include at least one routine 148 directed to separating the image data into smaller standard-sized images. In such configurations, the image sensor 22 may be a wide-angle camera that captures wide-angled image data that is separated into about two standard images. The originally captured image data and/or the processed image data, collectively referred to herein as the image data, may then be communicated for additional processing and analyzing.

The monitoring system 44 may include a controller 150 having a processor 152, a memory 154, and other control circuitry. Instructions or routines 156 are stored within the memory 154 and executable by the processor 152. The control circuitry may include communication circuitry 158 for bidirectional communication.

The controller 150 is communicatively coupled with the imager assembly 18 to receive the image data. The controller 150 may further process the image data. In various examples, the controller 150 is configured to analyze pixels of the image data received from the imager assembly 18. The controller 150 may be configured to separate the image data into multiple sub-images 160, such as sub-images 160A, 160B illustrated in FIG. 11. The sub-images 160A, 160B may correspond with the two standard images separated from the wide-angle image data by the imager assembly 18.

The controller 150 may include at least one routine 156 that splits the image data into the sub-images 160 that correspond with the image views. For example, when the secondary mirror assembly 30 includes the two secondary mirrors 32, 34, the controller 150 may be configured to split the image data into two sub-images 160A, 160B. The sub-image 160A corresponds with the image view reflected from the secondary mirror 32 and the sub-image 160B corresponds with the image view reflected from the secondary mirror 34. The image data, such as a single image capture by the image sensor 22, may be divided into the sub-images 160 based on the number of secondary mirrors 32, 34, 126, 128 in the secondary mirror assembly 30. Generally, the sub-images 160 collectively form the image data or capture obtained by the image sensor 22.

The controller 150 is configured to divide the image data across the single image sensor 22. In certain aspects, the controller 150 may divide the image data into more than two sub-images 160. As an array resolution of the image sensor 22 is increased or a total pixel resolution in the sub-images 160 decreases, it is possible to split or divide the final image data into more than two sub-images 160. In such examples, the controller 150 includes at least one routine 156 to divide a final RGB array output into corresponding sections aligning each section with the image view reflected onto the image sensor 22. The controller 150 may store information related to which section of the image data aligns with the various image views of the secondary mirror assembly 30. Each image view reflected onto the image sensor 22 is a predefined size based on the secondary mirror assembly 30. Based on the predefined size, the controller 150 may determine which pixels of the image correspond to which secondary mirror 32, 34, 126, 128 based on the location the pixels fall on the final image data. For example, with two image views, the pixels may be split in half and with four image views, the pixels may be split into quadrants. The controller 150 may selectively process and analyze a portion of the pixels based on the corresponding image view.

Referring still to FIG. 10, the controller 150 is configured to analyze and overlay the sub-images 160. The controller 150 may determine an image quality of the sub-images 160 to determine which sub-images 160 are to be used in subsequent analysis. Different types of analysis may utilize a different number of sub-images 160.

In various examples, the monitoring system 44 may utilize an obstructed mirror contingency process for updating the image processing in real-time during a cooking process. The controller 150 is configured to determine the image quality of each sub-image 160 derived from or included in the image data. The controller 150 may compare the sub-images 160 to a predefined quality threshold. The image quality of the image data may be affected by obstructions on the secondary mirrors 32, 34, 126, 128, such as steam, grease, food splatter, etc. The low image quality produced by an obstructed mirror may affect machine learning of the monitoring system 44 as the obstructed image data becomes noise in the machine learning process. The contingency switching process between sub-images 160 allows the monitoring system 44 to proceed at or about near-full proficiency for the remainder of the cooking process until the user can remove the obstruction. This contingency may also be advantageous when a cooking receptacle (e.g., pan, etc.) obstructs at least one of the secondary mirrors 32, 34, 126, 128. The controller 150 may also be configured to notify the user that there is an obstruction affecting the secondary mirror assembly 30, as described further herein.

As previously stated, different types of analysis with the image data may utilize a different number of sub-images 160. When excess sub-images 160 are obtained (e.g., more sub-images 160 than utilized by the selected analysis), the excess sub-images 160 may be substituted into the subsequent analysis when at least one sub-image 160 has an image quality below the predefined quality threshold. In this way, the obstructed sub-image 160 may be replaced by the controller 150 by a non-obstructed sub-image 160 to complete the analysis of the image data. The substitution or replacement may occur during the cooking process, such that the monitoring of the food item 82 during the cooking process is not substantially affected. The controller 150 may be configured to utilize rotated or reverse perspectives in each analysis without the different perspective from the substituted sub-image 160 without adversely affecting the analysis. In this way, the controller 150 is configured to recognize and analyze the image data from varying perspectives.

In various aspects, the image data, including the sub-images 160, is analyzed with an image recognition routine 156. Using the image recognition routine 156, the controller 150 is configured to analyze the image data to determine a type of the food item 82 within the cooking cavity 14. The controller 150 may additionally or alternatively include a classification system for determining a food type of the food item 82 in the cooking cavity 14. The memory 152 may include stored information about types of food items 82.

In addition to food type, the controller 150 may include at least one routine 156 for analyzing the image data to determine a doneness of the food item 82 within the cooking cavity 14. Generally, the imager assembly 18 continually captures and communicates image data to the controller 150 during a cooking process. The controller 150 may monitor progressive doneness during the cooking process. In certain aspects, the doneness may be determined by a brownness of the food item 82. In additional non-limiting examples, the doneness may be determined by a change in size or shape of the food item 82. The use of the multiple image views, allows each sub-image 160 to be a different perspective of the food item 82. The different perspectives may be combined to form a three-dimensional image through stereovision. The three-dimensional image may be monitored to determine if the food item 82 has changed in size or shape, including mass, depth, and volume. This may be advantageous for food items 82, such as bread, that rise during the cooking process. The multiple perspectives from the secondary mirror assembly 30 enable stereovision, which allows detection of states between rising and falling of certain food items 82.

The controller 150 is configured to monitor the food item 82 during a cooking process. The controller 150 is communicatively coupled to the heating element 78 and may adjust the heating element 78 in response to the determined doneness of the food item 82. The doneness may be detected by, for example, browning of the food item 82 or a sufficient change in size or shape of the food item 82. The controller 150 may be configured to raise or lower a cooking temperature within the cooking cavity 14. Additionally or alternatively, the controller 150 may increase or decrease a cooking time for the food item 82. Automatic adjustments to the cooking temperature and the cooking time may be communicated to the user.

Referring still to FIG. 10, using stereovision, the controller 150 may determine the cooking level 98 of the racks 100 in the cooking cavity 14 (e.g., a rack level). Specifically, the controller 150 may determine on which rack 100 the food item 82 is positioned and at which level that rack 100 is positioned. At least one secondary mirror 32, 34, 126, 128 may be placed at each cooking level 98 or at each grouping of cooking levels 98 to obtain multiple perspectives of the cooking levels 98. Alternatively, the secondary mirrors 32, 34, 126, 128 may be arranged at positions or angles such that each cooking level 98 is included in the reflection zone 122 of at least one secondary mirror 32, 34, 126, 128. The multiple views or perspectives of the cooking levels 98 may allow for the image data to be obtained in portions of the cooking cavity 14 that may be otherwise obscured by the food item 82 or the cooking receptacle.

The controller 150 is configured to analyze the image data to determine the presence or absence of the food item 82 on each rack 100 within the cooking cavity 14. In this way, the controller 150 may determine an exact position of the food item 82, which may be advantageous for providing more precise cooking results. The controller 150 may adjust the cooking temperature, the cooking time, or other aspects of the cooking process based on the exact position of the food item 82 within the cooking cavity 14.

Additionally or alternatively, the controller 150 may adjust which image data is processed based on the precise position of the food item 82. The image data obtained from the portion of the field of view 24 that includes the food item 82 is processed, while the image data without the food item 82 (e.g., empty pixels) may not be processed. This may be advantageous for improving machine learning of the monitoring system 44 as the empty pixels may be noise that affects the image data processing. Additionally or alternatively, the image sensor 22 may be adjustable to limit the empty pixels that are processed. The field of view 24 may also be adjustable to be broader, narrower, positionally shifted, or any combination thereof. In various examples, the image sensor 22 may be adjusted to change the scope of the field of view 24. It is contemplated that the lens 64 may be adjusted to change the sharpness and/or quality of the image data obtained by the image sensor 22.

The controller 150 may determine whether the rack 100 is positioned at the correct cooking level 98 for the type of food item 82. The controller 150 may store an ideal cooking level 98 for various types of food items 82 and may compare the cooking level 98 determined from the image data with the ideal cooking level 98. For example, if the food item 82 is a baked good, a more central cooking level 98 may be advantageous. If the food item 82 (e.g., a baked good) is positioned too close to the heating element 78, the food item 82 may burn. In this way, the controller 150 may determine whether the food item 82 is positioned at the ideal or correct cooking level 98. The controller 150 may be configured to notify the user if the food item 82 is that an incorrect or less-than-ideal cooking level 98, as described further herein.

Figure 12:
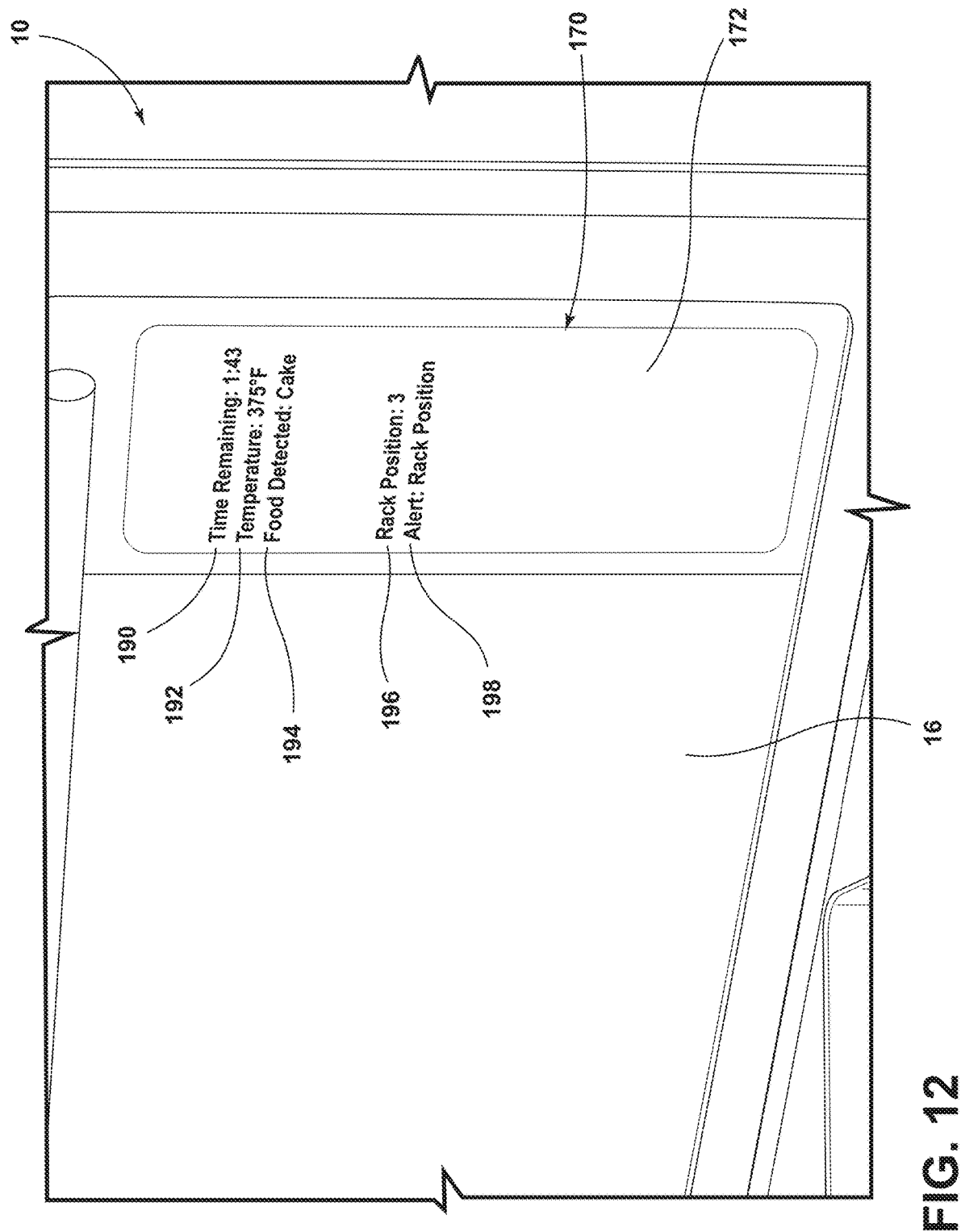
FIG. 12 is representative of a notification from a monitoring system displayed on a user interface of a cooking appliance, according to the present disclosure.
Figure 13:
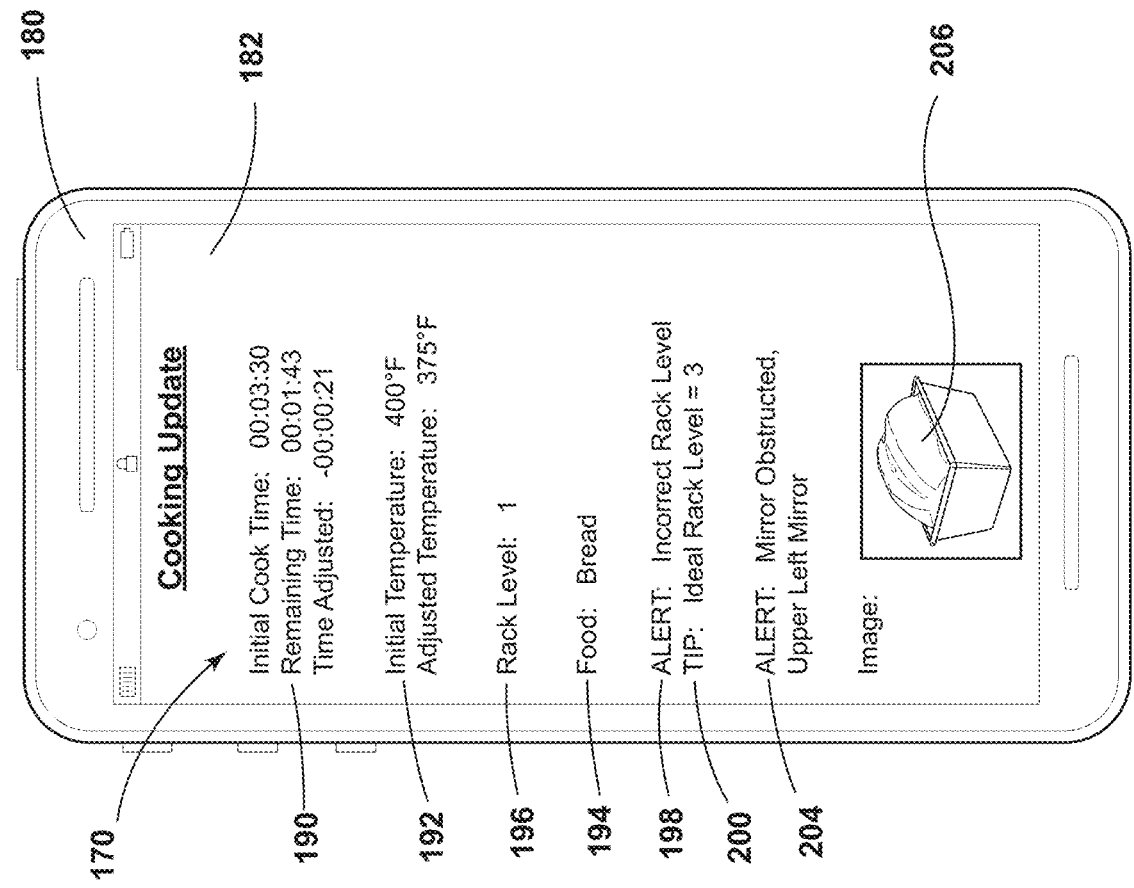
FIG. 13 is representative of a notification from a monitoring system displayed on a remote device, according to the present disclosure.

Referring still to FIG. 10, as well as FIGS. 12 and 13, the controller 150 may be configured to generate a notification 170 related to the image processing, information obtained from the image data, the cooking process, adjustments to the cooking process in response to the image data, or a combination thereof. In various examples, the notification 170 may be displayed on a user interface 172 of the cooking appliance 10.

Additionally or alternatively, the controller 150 may be communicatively coupled to a remote device 180 having a display 182. In such examples, the controller 150 is configured to communicate the notification 170 to the remote device 180 through a wireless communication interface. The controller 150 may include the communication circuitry 158, which may be configured to communicate with the remote device 180 and/or remote servers (e.g., cloud servers, Internet-connected databases, computers, etc.) via the communication interface. The communication interface may be a wireless interface, such that the cooking appliance 10 and the remote device 180 are configured to emit wireless signals.

The communication interface may correspond to a variety of communication protocols configured to distribute data among various electronic devices. For example, the communication interface may include an IEEE 802.11 connection, an IEEE 802.15 connection, a Bluetooth® connection, a Wi-Fi connection, a WiMAX connection, cellular signal, signal using shared wireless access protocol cord axis (SWAP-CA), or any other type of radiofrequency or wireless signal. An IEEE 802.15 connection includes any wireless personal area networks (WPAN), such as ZigBee®, Z-wave®, Bluetooth®, UWB, and IrDA. In this way, the communication interface may provide for data communication between the controller 150 and the remote device 180. The remote device 180 may be, for example, a phone, a tablet, a computer, a wearable device, or other electronic devices.

Whether displayed on the user interface 172 or the remote device 180, the notification 170 may include a variety of information. The notification 170 may include a variety of information. For example, the notification 170 may include cooking time information 190. The cooking time information 190 may include an initial cooking time, and a current remaining cooking time, and an updated cooking time. Additionally, the cooking time information 190 may include a cooking time adjustment based on the automatic adjustment in response to the image data (such as the doneness) as described herein. The notification 170 may also include temperature information 192. The temperature information 192 may include an initial cooking temperature as well as a current cooking temperature. The current cooking temperature may be a result of an automatic adjustment based on the analysis of the image data as described herein.

Additionally or alternatively, the notification 170 may include food type information 194. The food type information 194 may include specific food and/or a classification of the food item 82. In additional non-limiting examples, the notification 170 may also include rack level information 196. The rack level information 196 may include the cooking level 98 at which the rack 100 with the food item 82 is positioned. Based on the rack level information 196, the notification 170 may include a rack alert 198. The rack alert 198 may inform the user that the food item 82 is positioned at the incorrect cooking level 98 or a less-than-ideal cooking level 98 based on the food type information 194. In addition to the rack alert 198, the notification 170 may also include a cooking tip 200. The cooking tip 200 may include the ideal cooking level 98 for the food item 82 in the cooking cavity 14. The cooking tip 200 may also include other information for adjusting the cooking process (e.g., time, temperature, etc.) if the food item 82 is to stay at the current, incorrect cooking level 98. The cooking tip 200 may be advantageous for assisting the user during the cooking process to optimize the doneness of the food item 82.

In an additional non-limiting example, the notification 170 may also include an obstruction alert 204 if any portion of the secondary mirror assembly 30 is obstructed. The obstruction alert 204 may also include which secondary mirror 32, 34, 126, 128 is obstructed. Additionally or alternatively, the notification 170 may communicate actions to the user based on the type of obstruction. For example, if the controller 150 determines that food splatter is on one of the secondary mirrors 32, 34, 126, 128, the notification 170 may include a tip to clean the secondary mirror assembly 30. In another non-limiting example, if the controller 150 determines that the cooking receptacle is obstructing a view of the food item 82, the notification 170 may include a tip that an alternate cooking receptacle be used in the future. Additionally or alternatively, the notification 170 may include a viewable image 206 of the food item 82 so the user may also monitor or confirm the doneness of the food item 82. The viewable image 206 may be one of the sub-images 160, the image data, the three-dimensional stereovision image, or a combination thereof. The notification 170 may be visual, audible, haptic, or a combination thereof without departing from the teachings herein.

Referring to FIGS. 1-13, the monitoring system 44 is configured to actively monitor the food item 82 within the cooking cavity 14 during the cooking process. The monitoring system 44 may be activated based on a door triggering event. For example, when the door 16 is opened and then closed, the monitoring system 44 may be activated to determine whether the food item 82 is positioned within the cooking cavity 14. Additionally or alternatively, the monitoring system 44 may be activated when the heating element 78 is activated.

The secondary mirrors 32, 34, 126, 128 are arranged around the cooking cavity 14 to reflect various image views to the primary mirror assembly 68. Each secondary mirror 32, 34, 126, 128 reflects a separate and unique image view of the cooking cavity 14 to provide multiple perspectives to the image sensor 22. The image views are reflected from the secondary mirror assembly 30 to the primary mirror assembly 68, which then reflects the image views to the image sensor 22. The image sensor 22 captures the image data, including the multiple image views, and communicates the image data to the controller 150 for use by the cooking appliance 10. The image data may be analyzed by the controller 150 and utilized to control the operation of the cooking appliance 10, to control the cooking process, and to alert the user about adjustments and cooking tips as described herein. The monitoring system 44 may monitor the progress of the food item 82 throughout the cooking process and automatically make adjustments based on information obtained from the image data.

Use of the present system may provide for a variety of advantages. For example, the monitoring system 44 may provide a flexible implementation in the cooking appliance 10. In this way, the imager assembly 18 may be spaced from the heating element 78 and utilize the primary mirror assembly 68 and the secondary mirror assembly 30 to obtain multiple views of the cooking cavity 14. The imager assembly 18 may be spaced from the heating element 78 to increase the longevity of the image sensor 22, as well as reduce splatter on the lens 64. Moreover, the monitoring system 44 may reduce manufacturing costs by reducing additional venting used in convention systems for cooling cameras and other image devices. Additionally, the monitoring system 44 uses stereovision with the single image sensor 22 and multiple different views of the cooking cavity 14 from various mirrors. Stereovision may be advantageous for providing a three-dimensional image of the cooking cavity 14, which allows for depth, volume, and mass determinations of the food item 82 within the cooking cavity 14. Further, the secondary mirror assembly 30 may include between about two mirrors and about four mirrors within or adjacent to the cooking cavity 14 to provide multiple image views. The mirrors within the monitoring system 44 may also allow monitoring of an increased area within the cooking cavity 14.

Also, the monitoring system 44 is configured to determine a variety of information about the food item 82 using the image data received by the imager assembly 18. The controller 150 is configured to determine the type of food item 82 within the cooking cavity 14, the doneness of the food item 82, and the cooking level 98 of the rack 100 on which the food item 82 is positioned. Further, the controller 150 may use the various determinations to adjust the operation of the cooking appliance 10. For example, the monitoring system 44 may adjust the cooking temperature or the cooking time based on at least the doneness determined by the controller 150. Additionally, the monitoring system 44 may notify the user that the food item 82 is positioned at the improper cooking levels 98 based on the type of food. Further, the monitoring system 44 may update in real-time to disregard image views from obstructed secondary mirrors 32, 34, 126, 128 and substitute non-obstructed sub-images 160. The real-time adjustment may avoid occlusions and obstructions within the image data. Additional benefits or advantages will be realized and/or achieved.

The device disclosed herein is further summarized in the following paragraphs and is further characterized by combinations of any and all of the various aspects described therein.

According to another aspect of the present disclosure, a cooking appliance includes a body defining a cooking cavity. A door is rotatably coupled to the body. An imager assembly is coupled to an interior surface of the door. The imager assembly includes an image sensor configured to obtain image data within a field of view, a first primary mirror positioned at a first angle proximate to the image sensor and within the field of view, and a second primary mirror positioned at a second angle proximate to the image sensor and within the field of view. A secondary mirror assembly includes multiple secondary mirrors coupled to the body within the cooking cavity. The secondary mirrors reflect image views within the cooking cavity to the first primary mirror and the second primary mirror, which reflects the image views to the image sensor to be captured as the image data.

According to another aspect, a controller is operably coupled to an imager assembly to receive image data. The controller is configured to separate the image data into multiple sub-images for image recognition processing. Each sub-image corresponds with one of the secondary mirrors.

According to another aspect, multiple secondary mirrors include a first secondary mirror disposed in a first rear corner within a cooking cavity and a second secondary mirror disposed within a second rear corner of the cooking cavity.

According to another aspect, multiple secondary mirrors include a third secondary mirror disposed in a third rear corner within a cooking cavity and a fourth secondary mirror disposed within a fourth rear corner of the cooking cavity.

According to another aspect, an imager assembly includes a support structure defining an interior cavity. An image sensor is disposed on a first side of the interior cavity and a first primary mirror and a second primary mirror are disposed on a second side of the interior cavity.

According to another aspect, a controller is operably coupled to an imager assembly. The controller is configured to determine at least one of a food type, a food doneness, a cooking time, a rack level, and an obstruction on at least one of multiple secondary mirrors utilizing image data.

According to another aspect of the present disclosure, a stereovision monitoring system for a cooking appliance includes a body defining a cooking cavity. A door is rotatably coupled to the body. An imager assembly is coupled to one of the door and the body. The imager assembly includes a support feature that defines an interior cavity, an imager coupled to the support feature on a first side of the interior cavity, and at least one primary mirror coupled to the support feature on a second side of the interior cavity. At least one secondary mirror is disposed within the cooking cavity. The at least one secondary mirror reflects at least one image view of the cooking cavity to the at least one primary mirror. The at least one primary mirror reflects the at least one image view to the imager to be captured as image data. A controller is operably coupled to the imager assembly to receive the image data.

According to another aspect, at least one primary mirror includes a first primary mirror and a second primary mirror. At least one secondary mirror includes a first secondary mirror and a second secondary mirror.

According to another aspect, at least one image view includes a first image view and a second image view. A first secondary mirror reflects the first image view to a first primary mirror and a second secondary mirror reflects the second image view to a second primary mirror.

According to another aspect, a controller is configured to separate image data into multiple sub-images that correspond with a first image view and a second image view for image recognition processing.

According to another aspect, a rack is disposed within a cooking cavity. A controller is configured to process image data to determine at least one of a rack level within the cooking cavity and if a food item is disposed on the rack.

According to another aspect, a controller is configured to process image data to determine a type of food. The controller is configured to generate a notification if a rack is disposed at an incorrect cooking level based on the type of food.

According to another aspect, a controller is configured to determine whether at least one secondary mirror is obstructed based on image data that corresponds with at least one image view reflected from the at least one secondary mirror.

According to another aspect, a heating element is disposed within a cooking cavity and is operably coupled to a controller. The controller is configured to adjust a cooking temperature produced by the heating element in response to image data.

According to yet another aspect, an image system for a cooking appliance includes a support structure. An imager is coupled to the support structure. The imager is configured to obtain image data within a field of view. A primary mirror assembly is coupled to the support structure proximate to the imager. The primary mirror assembly includes a first primary mirror, which is disposed at a first angle within the field of view of the imager, and a second primary mirror, which is disposed at a second angle within the field of view of the imager. A secondary mirror assembly is configured to reflect image views of the cooking cavity to the primary mirror assembly. The image views are reflected by the primary mirror assembly to the imager to be captured as the image data. A controller is configured to receive the image data from the imager.

According to another aspect, a secondary mirror assembly includes a secondary mirror disposed in at least one front corner of a cooking cavity.

According to another aspect, a controller is configured to generate a notification to be communicated to a remote device.

According to another aspect, a notification includes at least one of a correct cooking level, a type of food within a cooking cavity, an updated cooking time, and a cooking temperature.

According to another aspect, a secondary mirror assembly includes multiple secondary mirrors. A controller is configured to separate the image data into multiple sub-images that correspond with the multiple secondary mirrors.

According to another aspect, a controller is configured to analyze the image data to determine an image quality of each sub-image. If the image quality of at least one of the sub-images is below a predefined quality threshold, the controller is configured to determine that a corresponding secondary mirror is obstructed and consequently configured to utilize a different sub-image for subsequent image processing.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
   a body defining a cooking cavity;
   a door rotatably coupled to the body;
   an imager assembly coupled to an interior surface of the door, wherein the imager assembly includes:
     an image sensor configured to obtain image data within a field of view;
     a first primary mirror positioned at a first angle proximate to the image sensor and within the field of view; and
     a second primary mirror positioned at a second angle proximate to the image sensor and within the field of view; and
   a secondary mirror assembly including multiple secondary mirrors coupled to the body within the cooking cavity, wherein the multiple secondary mirrors reflect image views within the cooking cavity to the first primary mirror and the second primary mirror which reflect the image views to the image sensor to be captured as the image data.

2. The cooking appliance of claim 1, further comprising:
   a controller operably coupled to the imager assembly to receive the image data, wherein the controller is configured to separate the image data into multiple sub-images for image recognition processing, wherein each sub-image corresponds with one of the multiple secondary mirrors.

3. The cooking appliance of claim 1, wherein the multiple secondary mirrors include a first secondary mirror disposed in a first rear corner within the cooking cavity and a second secondary mirror disposed within a second rear corner of the cooking cavity.

4. The cooking appliance of claim 3, wherein the multiple secondary mirrors include a third secondary mirror disposed in a third rear corner within the cooking cavity and a fourth secondary mirror disposed within a fourth rear corner of the cooking cavity.

5. The cooking appliance of claim 1, wherein the imager assembly includes a support structure defining an interior cavity, and wherein the image sensor is disposed on a first side of the interior cavity and the first primary mirror and the second primary mirror are disposed on a second side of the interior cavity.

6. The cooking appliance of claim 1, further comprising:
   a controller operably coupled to the imager assembly, wherein the controller is configured to determine at least one of a food type, a food doneness, a cooking time, a rack level, and an obstruction on at least one of the multiple secondary mirrors utilizing to the image data.

7. A stereovision monitoring system for a cooking appliance, comprising:
- a body defining a cooking cavity;
- a door rotatably coupled to the body;
- an imager assembly coupled to one of the door and the body, wherein the imager assembly includes:
  - a support feature defining an interior cavity;
  - an imager coupled to the support feature on a first side of the interior cavity; and
  - at least one primary mirror coupled to the support feature on a second side of the interior cavity;
- at least one secondary mirror disposed within the cooking cavity, wherein the at least one secondary mirror reflects at least one image view of the cooking cavity to the at least one primary mirror, wherein the at least one primary mirror reflects the at least one image view to the imager to be captured as image data; and
- a controller operably coupled to the imager assembly to receive the image data.

8. The stereovision monitoring system of claim 7, wherein the at least one primary mirror includes a first primary mirror and a second primary mirror, and wherein the at least one secondary mirror includes a first secondary mirror and a second secondary mirror.

9. The stereovision monitoring system of claim 8, wherein the at least one image view includes a first image view and a second image view, and wherein the first secondary mirror reflects the first image view to the first primary mirror and the second secondary mirror reflects the second image view to the second primary mirror.

10. The stereovision monitoring system of claim 9, wherein the controller is configured to separate the image data into multiple sub-images that correspond with the first image view and the second image view for image recognition processing.

11. The stereovision monitoring system of claim 7, further comprising:
- a rack disposed within the cooking cavity, wherein the controller is configured to process the image data to determine at least one of a rack level within the cooking cavity and if a food item is disposed on the rack.

12. The stereovision monitoring system of claim 11, wherein the controller is configured to process the image data to determine a type of food, and wherein the controller is configured to generate a notification if the rack is disposed at an incorrect cooking level based on the type of food.

13. The stereovision monitoring system of claim 7, wherein the controller is configured to determine whether the at least one secondary mirror is obstructed based on the image data that corresponds with the at least one image view reflected from the at least one secondary mirror.

14. The stereovision monitoring system of claim 7, further comprising:
- a heating element disposed within the cooking cavity and operably coupled to the controller, wherein the controller is configured to adjust a cooking temperature produced by the heating element in response to the image data.

15. An image system for a cooking appliance, comprising:
- a support structure;
- an imager coupled to the support structure, wherein the imager is configured to obtain image data within a field of view;
- a primary mirror assembly coupled to the support structure proximate to the imager, wherein the primary mirror assembly includes:
  - a first primary mirror disposed at a first angle within the field of view of the imager; and
  - a second primary mirror disposed at a second angle within the field of view of the imager;
- a secondary mirror assembly configured to reflect image views of a cooking cavity to the primary mirror assembly, and wherein the image views are reflected by the primary mirror assembly to the imager to be captured as the image data; and
- a controller configured to receive the image data from the imager.

16. The image system of claim 15, wherein the secondary mirror assembly includes a secondary mirror disposed in at least one front corner of the cooking cavity.

17. The image system of claim 15, wherein the controller is configured to generate a notification to be communicated to a remote device.

18. The image system of claim 17, wherein the notification includes at least one of a correct cooking level, a type of food within the cooking cavity, an updated cooking time, and a cooking temperature.

19. The image system of claim 15, wherein the secondary mirror assembly includes multiple secondary mirrors, and wherein the controller is configured to separate the image data into multiple sub-images that correspond with the multiple secondary mirrors.

20. The image system of claim 19, wherein the controller is configured to analyze the image data to determine an image quality of each sub-image, and wherein if the image quality of at least one of the sub-images is below a predefined quality threshold the controller is configured to determine that the corresponding secondary mirror is obstructed and consequently configured to utilize a different sub-image for subsequent image processing.

* * * * *